United States Patent
Mehr et al.

(10) Patent No.: US 11,694,247 B2
(45) Date of Patent: *Jul. 4, 2023

(54) SYSTEM AND METHOD FOR SELLING AND CUSTOMIZING PRODUCTS AND SERVICES VIA A NETWORK OF COMPUTER SYSTEMS

(71) Applicant: Zoosk, Inc., Berlin (DE)

(72) Inventors: Alexander F. Mehr, San Francisco, CA (US); Shayan G. Zadeh, San Francisco, CA (US); Doug H. Wehmeier, San Francisco, CA (US); Charles E. Gotlieb, San Francisco, CA (US)

(73) Assignee: Zoosk, Inc., Lehi, UT (US)

(*) Notice: Subject to any disclaimer, the term of this patent is extended or adjusted under 35 U.S.C. 154(b) by 70 days.

This patent is subject to a terminal disclaimer.

(21) Appl. No.: 17/164,836

(22) Filed: Feb. 1, 2021

(65) Prior Publication Data
US 2021/0233138 A1 Jul. 29, 2021

Related U.S. Application Data

(63) Continuation of application No. 16/241,626, filed on Jan. 7, 2019, now Pat. No. 10,909,598, which is a continuation of application No. 14/101,236, filed on Dec. 9, 2013, now Pat. No. 10,176,504, which is a continuation of application No. 13/444,643, filed on Apr. 11, 2012, now Pat. No. 8,606,646.

(60) Provisional application No. 61/516,937, filed on Apr. 11, 2011.

(51) Int. Cl.
*G06Q 30/00* (2023.01)
*G06Q 30/0601* (2023.01)

(52) U.S. Cl.
CPC ..... *G06Q 30/0621* (2013.01); *G06Q 30/0611* (2013.01)

(58) Field of Classification Search
None
See application file for complete search history.

(56) References Cited

U.S. PATENT DOCUMENTS

| | | | |
|---|---|---|---|
| 7,945,628 B1* | 5/2011 | Lunceford | G06Q 50/01 709/227 |
| 2012/0166261 A1* | 6/2012 | Velusamy | G06Q 30/0214 705/14.16 |
| 2014/0089135 A1* | 3/2014 | Linh | G06Q 30/0641 705/26.7 |
| 2015/0106183 A1* | 4/2015 | McEvilly | G06Q 30/0224 705/14.1 |
| 2015/0112778 A1* | 4/2015 | Feldman | G06Q 30/0214 705/14.66 |

* cited by examiner

*Primary Examiner* — Mila Airapetian
(74) *Attorney, Agent, or Firm* — Innovation Partners LLC; Charles E Gotlieb (57) ABSTRACT

A system and method allows one or more users to purchase an offering of goods or services using at least three computer systems, by one user making a proposal for the two to jointly consume the offering, and the other user accepting the proposal.

14 Claims, 3 Drawing Sheets

SYSTEM AND METHOD FOR SELLING AND CUSTOMIZING PRODUCTS AND SERVICES VIA A NETWORK OF COMPUTER SYSTEMS

CROSS REFERENCE TO RELATED APPLICATIONS

This application is a continuation of U.S. patent application Ser. No. 16/241,626, entitled, "System and Method for Selling and Customizing Products and Services via a Network of Computer Systems" filed by Alexander F. Mehr, Shayan G. Zadeh, Dough H. Wehmeier and Charles E. Gotlieb on Jan. 7, 2019, which is a continuation of U.S. patent application Ser. No. 14/101,236 entitled, "System and Method for Selling and Customizing Products and Services via a Network of at Least Three Computer Systems" filed by Alexander F. Mehr, Shayan G. Zadeh, Dough H. Wehmeier and Charles E. Gotlieb on Dec. 9, 2013, which is a continuation of U.S. patent application Ser. No. 13/444,643 entitled, "System and Method for Selling Products and Services via a Network of at Least Three Computer Systems" filed by Doug H. Wehmeier, Alex F. Mehr and Shayan G. Zadeh on Apr. 11, 2012, which claimed the benefit of U.S. Provisional patent Application Ser. No. 61/516,937 entitled, "Method and Apparatus for Selling Products and Services via a Network of at Least Three Computer Systems" filed by Doug H. Wehmeier, Alex F. Mehr and Shayan G. Zadeh on Apr. 11, 2011, and is related to U.S. provisional patent application Ser. No. 61/401,234 entitled, "Method and Apparatus for Locating Desired Traits in Resources Using a Network" filed on Aug. 10, 2010 by Alex F. Mehr and Shayan G. Zadeh and U.S. provisional patent application Ser. No. 61/403,735 entitled, "Method and Apparatus for Selecting Compatible Users for Activities Based on Experiences, Interests or Preferences as Identified from One or More Web Services" filed by Alex F. Mehr and Shayan G. Zadeh on Sep. 21, 2010, each having the same assignee as the present invention and each is incorporated by reference in its entirety.

FIELD OF THE INVENTION

The present invention is related to computer software and more specifically to computer software for arranging purchases via a computer network of at least three computer systems.

BACKGROUND OF THE INVENTION

Users of web sites may sometimes purchase a product or service for themselves, but may other times purchase a product or service for one or more other people instead of or in addition to themselves. What is needed is a system and method that can assist the user when purchasing products or services to be used by at least one person other than themselves.

SUMMARY OF INVENTION

A system and method receives profile and preference information from multiple users. Information describing an offering for a product or service is received with information that relates the offering to profile and/or preference information of users to whom the offering would most likely appeal. In one embodiment, the offering may be for a product or service that involves at least two users, such as a meal for two people or an activity such as a bowling package for two people.

The offering may include a discounted price not available to all other customers, an extra level of service not normally available to all other customers outside of the offering, or both.

When a user wishes to initiate a purchase of an offering, the user can see one or more offerings for a product and service that would most likely appeal to another user specified by the user, and the user may select one of the offerings. Alternately, the user can select an offering for a product or service and have one or more of the other users to which the offering is most likely to appeal displayed to the user making the selection, and that user may select one of the other users. The user may indicate that the user will be paying for the offering if the other user indicates that user will accept the offering, the user may indicate that the other user will pay for the offering if the other user accepts the offering, or the user may indicate other payment options, such as each user pays half or a different proportion for the offering.

A proposal is sent to the other user indicating that the user has selected an offering, and information about the user with which the other user will participate in the offering if the other user accepts, as well as an indication of whether the user or other user will be paying for the offering if the other user accepts. The other user may then browse the profile of the user if desired, and accept or decline the proposal. If the other user accepts the proposal, the user or other user indicated as paying for the offer will be charged for the offer and payment will be received. Part of the payment is provided to the vendor who will actually provide the goods and or services that make up the offering, and the remainder of the payment may be retained by the entity that operates the method or system or computer program products of the present invention. In one embodiment, only a limited number of acceptances of a given offering are allowed, after which further acceptances of proposals containing the offering are not allowed.

In the event that an additional product or service is supplied as part of the offering as described above, the system, method and computer program product, or the user who initiated the proposal may indicate parameters from the user's profile and/or the other user's profile to the vendor supplying the product or service under the offering and such vendor may adapt the additional product or service based on such information.

DETAILED DESCRIPTION OF A PREFERRED EMBODIMENT

Figure 1:
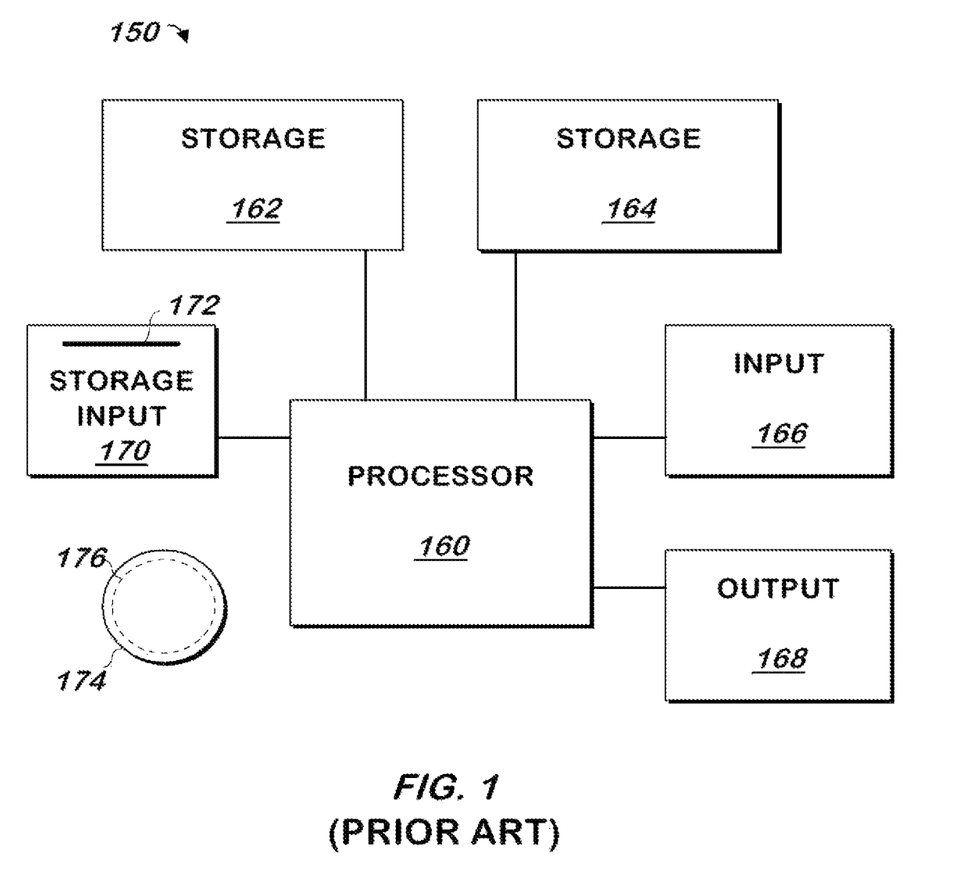
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include memory or disk storage and may include a conventional database. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T-SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a mobile telephone system such as a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
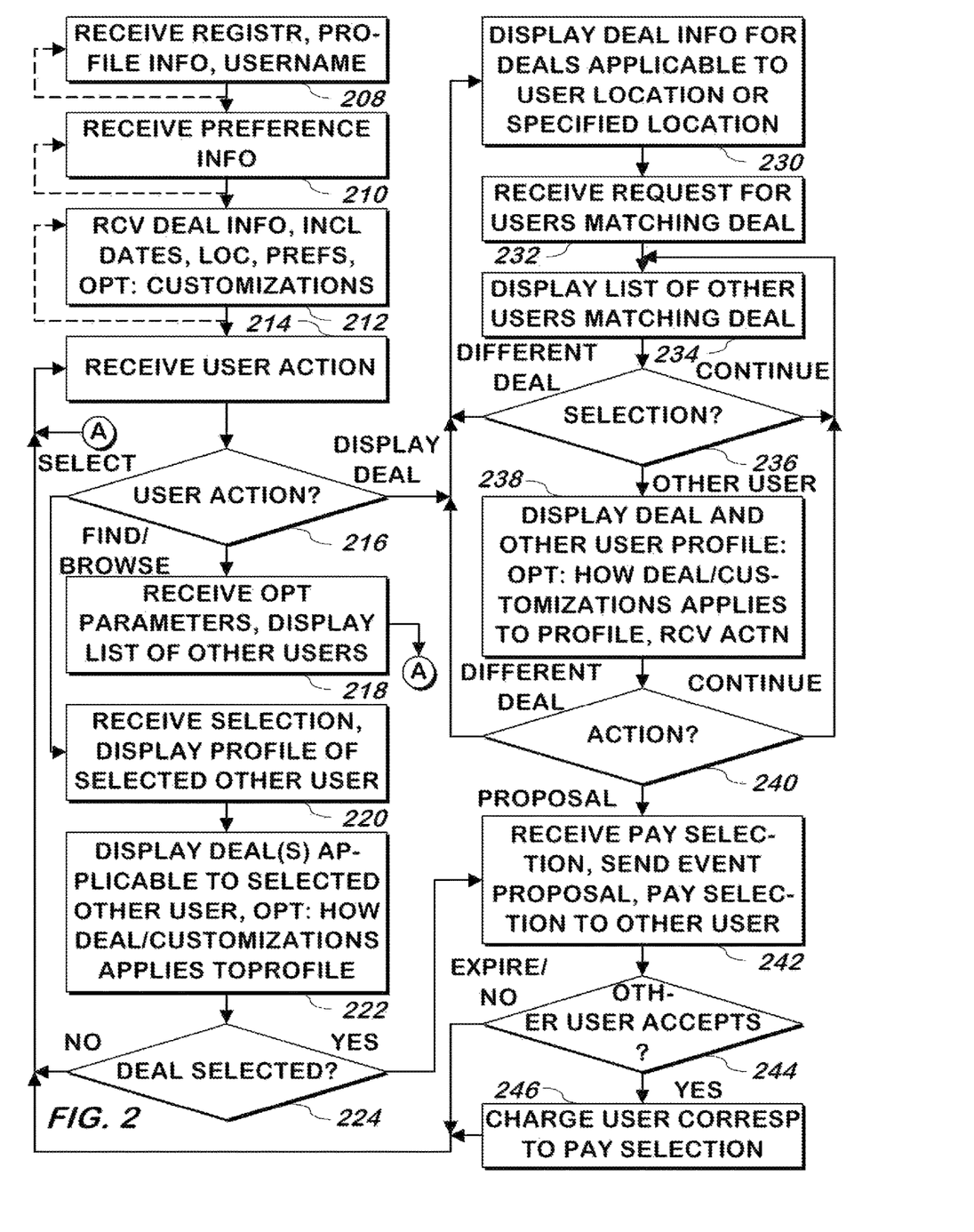
FIG. 2 is a flowchart illustrating a method of selling a good or service via a network of at least three computer systems according to one embodiment of the present invention.

Referring now to FIG. 2, a method of selling one or more products and/or services via at least three computer systems coupled to a network is shown according to one embodiment of the present invention. As used herein, a minimum of three computer systems are used to make and accept proposals to participate in an offering and to sell the offering, though other number of computer systems, higher or lower, may be used. The computer systems are coupled to one another via a network such as the Internet. Each computer system may be made up of one or more computers, such as personal computers, mobile devices, server computers or any combination thereof.

As described herein, an offering may be referred to as an offer or as a deal. An offer by one user to participate in an offering is referred to as a proposal.

Receive Profile and Preference Information From Multiple Users.

User registration, profile information and a username (and optionally a password) may be received from a user 208. In one embodiment, the username may be provided to the user. Registration information may include an e-mail address. The username may be unique among users.

Profile information may include a location, such as a zip code of each user's residence, sex, whether the user is straight or gay or bisexual and other demographic information. Step 208 may operate as an independent, continuously running process as indicated by the dashed line in the Figure. Thus any number of users may provide or update such information at any time. In the case of two users, they each may use a different computer system, A and B, coupled to server computer system C via a network such as the internet (each system located at least a mile from one another and owned and operated by different independent entities) to provide such information and perform other actions described herein. The registration information and profile information (and optionally the password) is stored associated with the username of the user who provided it. Some or all of such information may be received at any time from any number of users.

At any time, preference information may be received 210 from each of any number of users. Preference information may include the sex and sexual preference of other users the user would like to meet or date. Other preferences of the user may include preferences for or against colors, food, types of food (i.e. Mexican food) or other interests, products or services or elements thereof. Preference information may be received explicitly, such as by the user indicating a favorite color, favorite foods, foods they do not like, etc., or it may be received implicitly, such as information taken from "likes" or "check ins" indicated on social networking sites, information based on the usage of certain products or services, or the text of messages sent from that user. For example, if the user frequently checks into Mexican restaurants (e.g. via a service such as foursquare.com or facebook.com), the system and method may assume that the user has a preference for Mexican food. Different items may be categorized and the categories used to identify the preferences as described in the related applications. The preference and profile information received from a user is stored associated with the username for that user, for example, one the user has used to log in or register.

Receive Information about Offerings.

At any time, information about offerings may be received from a system administrator, the vendor who will provide the goods or services corresponding to such offerings, or both 212. Information about an offering may include a title of the offering, applicable dates during which the offering may be accepted (referred to as the "acceptance period"), dates within which the offering must be consumed, one or more locations at which the goods or services corresponding to the offering will be provided, an estimated acceptable range of travel by users to the offering, the price of the offering, a regular price of at least some of the goods and services provided under the offering if the price of the offering is discounted from the regular price, a description of the goods and/or services offered, and values of preferences or profile information of people, to which the offering is most likely to appeal, will have provided as described herein. For example, a preference for loud versus quiet events may be received from each user, and such preference may be used to indicate that a person most likely to have a preference for loud events would prefer an offering for bowling. An offer for a Mexican restaurant meal may be indicated as most likely to appeal to users who checked in to Mexican restaurants or to individual competitors of that restaurant, but not to people who have checked into the restaurant itself.

In one embodiment, the offering is discounted from the price the offering would cost a user if the user were to buy the offering in at least one setting other than that described herein. For example, the offering may be an offering for a credit for a restaurant meal for two people with a price that is lower than the amount of the credit. In one embodiment, each offering may be an offering for an event that would be attended by a couple on a date.

In one embodiment, the offering is discounted or has no discount over the regular price of the offering that would be available through channels outside those described herein. In such embodiment, the offering may include a service that would not be otherwise regularly offered to people purchasing the remainder of the offering outside of the manner described herein. For example, a restaurant including a credit for a meal for two people may, as part of the offering, include printing of a customized menu for the user receiving the proposal that has the name of that user, the name of the two users, and/or that names a dish after one or both users based on favorite foods of the user or users. The offering may include providing flowers at the table that include a color at least near the favorite color of the couple or the user who received the proposal. The favorite color and/or favorite foods may each be one of the preferences received from such users as described above.

Information about any number of offerings may be received at any time as part of step 212. In one embodiment, multiple offerings may be applicable to at least one user during at least one period of time.

User Indicates an Action.

At any time, a user may indicate an action, and such indication of an action is received 214. The indication may be an indication that the user wishes to perform a search or browse other users, the user wishes to select a searched, browsed or other user, or the user wishes to display one or more currently applicable offerings as described in more detail below.

Action is a Search for, or Browse, Other Users.

If the indication is that the user wishes to search or browse other users 216, optional search parameters may be received that include values of profile information and/or preferences that other users may select, and a list of other users whose profile and/or preference information meets any such parameters is displayed to the user, in an order, such as by least recently viewed by that user, located nearest to the user's location specified at registration, etc. 218. A photograph and some or all of the profile information of each such user may be displayed near the users on the list. The user may then perform another action and the method continues at step 214.

Action: Select a Profile.

If the action is to select a profile from a list as described above, or from another source 216, an identifier of the other user whose profile was selected by the user is received, and some or all of the profile information and preference information stored as described above corresponding to the selected profile of the other user selected are displayed to the user 220.

Display Offering Corresponding to Profile.

In conjunction with the display of step 220 or as a separate display, a description of the offering and other information from each of one or more offerings applicable to the user who made the selection, the other user whose profile was selected or both, are displayed 222 to the user.

The selection of which offerings to display is made by comparing the profile and/or preference information received with each offering whose acceptance period corresponds to the current date (i.e. the start of the acceptance period is on or before the current date, and the end of the acceptance period, less an optional threshold amount of time, is not before the current date) with the preference and/or profile information received from the user (including social network information), selected other user or both, and comparing the location of the offering and the acceptable distance specified (in one embodiment, if no acceptable distance is specified, a default value is used for the acceptable distance) with that offering with the locations of the user, the other user or both to make sure the other user or both user's locations are within the acceptable distance from any location specified for the offering.

As noted above and herein, the offering information may include values of preference or profile information that users to which the offering will appeal are likely to have supplied as described herein. In one embodiment, each such preference or profile information is received with a weight between 0 and 1, with higher weights indicative of a stronger correlation between the value and the user's likelihood of wanting to try the offering. In one embodiment, the weights for some or all of the specified values of preference or profile information may be between −1 and 1, so that preferences can be used to indicate users who would dislike an offering or one to whom the offer should not be made. Using the Mexican restaurant examples described above, the score would be higher for users who liked or checked in to (on one or more social networks) competitor restaurants of the one making the offer, but did not like or check into (via one or more social networks) the restaurant making the offer. The score corresponding to a user with respect to an offering is computed by summing the weights specified for the offering that correspond to each preference or profile information component of the user.

The offerings may be displayed in descending score for the selected user, for the other user or for a combined highest score for both users. In one embodiment, only those offerings exceeding a threshold one or more of such scores are displayed to the user.

As noted, the description and other information, such as the end of the acceptance period, the price, any additional services being provided as described herein, and other information from the selected one or more offerings with a score above a threshold are displayed with the selected user's profile as part of step 222.

In one embodiment, any or all of the profile and preference information specified by the offering, and whether the values of each of the user and the other user are within the range of values specified in the offering are also displayed to the user for each of the offerings, and the score contributions of the user and/or the selected user are displayed to allow the user to make a determination as to whether the offering is appropriate, and if there is more than one offering, such information may allow the user to make a better determination as to which of such offerings should be selected.

User Selects an Offering to Make a Proposal.

The user may select one of the offerings as part of step 222. If the user does not select an offering 224, the method continues at step 214, and the user may select a different other user or perform a new search or browse, for example, as described above.

If an offering is selected 224, the user is allowed to specify whether the user will be paying for some or all of the offering if the other user accepts the proposal for the user and the other user to consume the offering, or whether the other user is expected to pay for some or all of the offering if the other user accepts the proposal for the user and the other user to consume the offering, such specification is received, and a proposal is provided to the other user, for example to an e-mail inbox of the other user.

The proposal may specify any or all of the username of the user, some or all of the user's profile or preference information (or a link thereto), information from the offering including the end date for acceptance of the offering and any date by which the offering must be consumed, the applicable preference values of each user, and the contribution of each user to the score for that offering as described above, and the proportion of the offering price each user will pay if the other user accepts the proposal 242. The user may include a message for the other user in which one or more dates of the proposal is specified and the message will include such message.

Other User Declines Proposal.

The other user may accept or decline the proposal or allow it to expire. If the other user declines the proposal or allows it to expire 244, neither user is charged for the offering in the proposal. In another embodiment, the user who sent the proposal is charged a nominal fee, such as one cent or one dollar or one cent for every ten proposals sent that are not accepted, to prevent users from spamming with proposals other users in whom they are not really interested.

Proposal Accepted, Charge and Process.

If the other user accepts the proposal 244, if the other user who accepted is specified as paying for some or all of the offering, that user is charged for their share and the user who made the proposal is informed that the proposal has been accepted and charged for their share of the offering. When payment for the full amount of the offering has been received, a message is sent to both users indicating that the proposal is accepted and the user who made the proposal is provided with a receipt for payment or other indicia.

In one embodiment, the receipt or other indicia may be used to obtain the goods and/or services that are provided under the offering.

In one embodiment, payment may be made directly to the merchant who will provide the goods and services under the offering, and the receipt is provided when the user to whom the proposal was made accepts the offering.

In one embodiment, the offering information received in step 212 includes an upper limit of the number of times an offering will be provided. In such embodiment, only that number of acceptances of proposals for such offering are allowed. When accepted proposals for an offering have reached a limit, unread messages for unaccepted proposals for the same offering are not shown to users when they log in, messages that have been read for proposals for such offering that are not accepted are indicated as being withdrawn due to the limit the next time the user reads them, and the user who made the proposal is informed via a message that the limit for the offering corresponding to the proposal has been reached. The user may make a different proposal.

Providing Information to Allow Customization of the Offering.

In embodiment, the user or other user may contact the vendor who will provide the products and/or services under the offering to inform them of profile information or preference information from their own profiles, the other user's profile or both, that the vendor will use to customize the offering to the profile or preference values of one or both users. For example, the user can call a restaurant to make a reservation and provide the name, favorite color and food preferences of the user and/or other user, and the restaurant will provide flowers in that color or colors or a similar color or colors at the table of the user and other user and may customize the menu as described above for use when they consume the goods or services of the offering.

In another embodiment, as part of the offering information received in step 212, an e-mail address and an identifier of the preference and/or profile fields that are used to customize the offering are provided and received in step 212 as part of the offering information. In such embodiment, the values of such profile and/or preference fields from the user, other user or both, are automatically emailed to that e-mail address, along with an identifier unique to that offering that is also provided as part of the receipt provided as described above when the offer has been paid for or accepted.

When the user makes a reservation for the offering, or when the user shows up to consume the products or services provided as part of the offering, the user may provide the unique identifier to allow the merchant to perform the customizations for that user.

If the offering is for a specific date and time, the user might not need to provide the unique identifier, as the customization may be provided automatically, without further user or other user action. For example, if the offering is two tickets to a baseball game on a specific date and time, the user's name and other user's name may be provided to an e-mail address of the ball park at which the game will be played, and the names may be programmed to appear on the JUMBO IRON display on the date of the game, whether the user and other user show up to the game or not. Having peoples' names displayed in that manner may be available to some, but not all customers of the ball park, and thus, the display is not generally available to people purchasing tickets to the game outside of the offer, even though such a service will also be available to some ticket holders, such as those purchasing large blocks of tickets.

Search by Offering.

In one embodiment, instead of selecting another user and then seeing which offering or offerings apply to the other user, a user may select an offering and see which users correspond to the selected offering.

In such embodiment, as part of step 214, the user may indicate that the user wishes to display the offerings applicable to the current date (also referred to as "currently applicable offerings", which are those for which the start of the date of acceptance is on or before the current date, and the end date of acceptance is at least a threshold number of days after the current date, the threshold being any number greater or equal to zero, and for which any limit of acceptances for proposals for such offering has not been reached). If the user indicates that the user wishes to display offerings 216, offering information is displayed 230 for all offerings to which the user corresponds, based on that user's preferences and profile information, including the user's location and the specifications of each offering, and that have a period in which the offering must be accepted that includes the current date, though in one embodiment, the current date must be a threshold amount of time before the end of the period in which the offering must be accepted.

In one embodiment, a user corresponds to an offering if the score described above for that user based on the user's profile and preferences, and the offering information, exceeds a threshold. In another embodiment, all users are considered to correspond to all offerings, though the offerings will be displayed in descending order of the score, calculated as described above.

The user may be presented with links to each such offering and may view more detailed information about a selected offering by clicking the link, all as part of step 230. Another link may be displayed with the details of the offering that allows the user to see a list of other users corresponding to some or all of that user's preferences (e.g. if the user indicated a preference for women, the other users displayed to such user will all be women) whose preferences and/or profile information (including location) also correspond to the specification of the offering corresponding to the link the user selected and to the user (e.g. if the user is a man with a preference for heterosexual women, only heterosexual women will appear as another user). The list may include some of the profile information such as a photo and location, of each other user. The list may be sorted, for example, in descending order of the score for the other user's preference and profile information as it applies to the selected offering as described above. A path from the display of the additional information for an offering back to the list of offerings may be provided as part of step 230.

While the user is browsing the list of other users, the user may indicate a desire to see more information about a selected one of the other users displayed 232, and such other users' profile and/or preference information, optionally with the preference and profile values of the selected other user that correspond to values specified in the offering information being highlighted, are displayed to the user as part of step 234.

In one embodiment, the users who are displayed if the user clicks this link are selected via a three way correspondence: the user will see other users whose preference and profile information corresponds to at least some of the user's preferences, if the user corresponds to the other user's preferences, and if the selected offering corresponds to the other user's preference and profile information as described above.

The offering corresponds to the other user if the score from that other user's preference and profile information, using the offering information as described above, exceeds a threshold. This threshold may be higher for other users than it is for the user, because the user can further restrict that user's choices after investigating the title or other information of each offering.

In one embodiment, users are ordered in descending order of correspondence, with each of the three types of correspondence scored, weighted and summed to obtain the order. The weights may be identified using conventional regression analysis techniques to optimize for users to whom the other user proposes the offering and/or proposals that are accepted by the other user.

In one embodiment, only the other user with the highest weighted total correspondence is displayed.

As part of step 234, the user may look through the list of names, certain profile information (e.g. city of residence or distance of the other user's residence from the user's residence, and a photograph) of the other users on the list and select one of the users on the list, continue perusing the list, or select a different offering.

If the user continues perusing the list 236, the method continues at step 234. If the user indicates that the user would like to select a different offering 236, the method continues at step 230.

If the user selects one of the users on the list 236, preference and profile information about the selected other user are displayed, a description of the offering is displayed, and the preference and profile information of the other user that has a value that corresponds to that specified as part of the offering information is displayed in the same manner described above 238.

As part of step 238, the user may indicate an action, such as continue browsing users on the list, select a different offering, or make a proposal to the selected other user, and an indication of such action is received. If the action is to continue browsing users on the list 240, the method continues at step 234. If the action is to select a different offering 238, the method continues at step 230. If the action is to make a proposal 240, the method continues at step 242 as described above.

A user may make as many proposals to other users as desired in one embodiment, or the number of proposals may be limited to a maximum number of pending proposals per offerings, for all offerings, or both.

In one embodiment, if multiple proposals for the same offering are made to different users at the same time, a user may specify that only the first acceptance for that offering will be allowed. When such first acceptance is received, the other offers may be automatically withdrawn, for example, by deleting unseen e-mails containing the withdrawn proposals or by automatically sending an e-mail to proposals viewed but not answered indicating that the proposal is being withdrawn. The other user is then not allowed to accept the proposal. At any time, a user may manually withdraw a proposal in similar manners with similar effects as the automatic withdrawal of an offer.

System.

Figure 3:
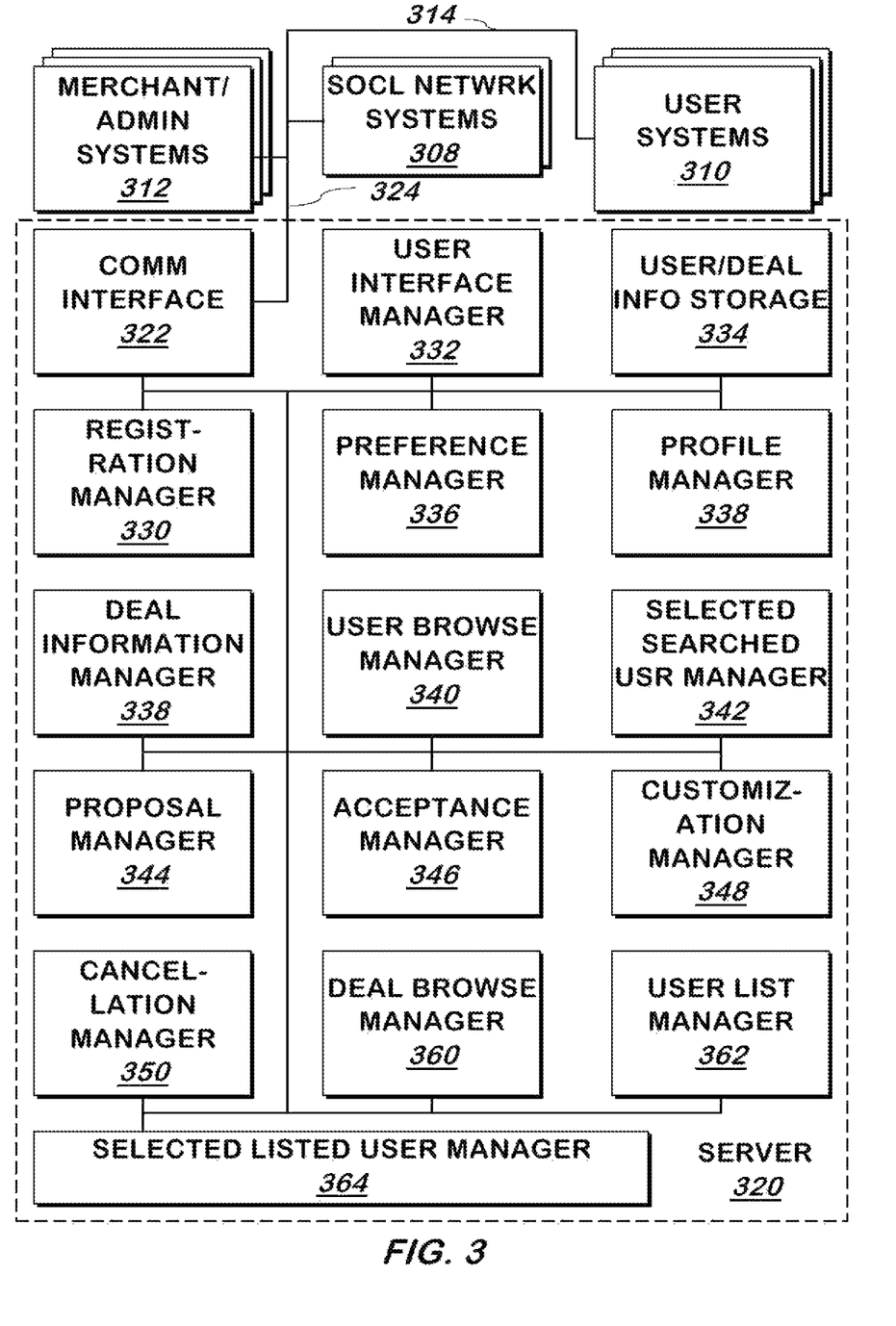
FIG. 3 is a block schematic diagram of a system for selling a good or service via a network of three computer systems according to one embodiment of the present invention.

Referring now to FIG. 3, a system for selling products and services via at least three computer systems coupled via a network is shown according to one embodiment of the present invention.

System Descriptions.

User systems 310 are used by the users described herein to communicate with server 320 via network 314, which may be one or more conventional Ethernet networks, the Internet, or both. Each user system 310 may be remotely located from some or all of the other user systems 310, for example, with more than a mile between some or all of them. Network 314 may be an Ethernet network, the Internet, or both.

Merchant/administrator systems 312 are used by merchants or system administrators or both to communicate with server 320 via network 314. Some or all of user systems and merchant systems are owned by entities that are independent of each other, that is, they are owned by individuals not employed by, or entities not under control of, and not controlling, the entity on whose behalf server 320 is operated.

User systems 310 and merchant/administrator system may include conventional personal computer systems or conventional cellular telephones, each running browsers, such as those described above. Server 320 may include one or more conventional computer systems configured with conventional server software. All communication between users and server 320 may be made via their respective user systems 310 and all communication between merchants and/or system administrators may be made via their respective merchant/administrator systems 312.

Server 320 includes a conventional communication interface 322 including a conventional TCP/IP-compatible communication interface running suitable communication protocols, and is coupled to network 314. All communication made with server is made via communication interface 322. User systems 310 and merchant/administrator systems 312 also include similar communication interfaces (not shown) that also have conventional keyboard, monitor and mouse communication interfaces.

Registration and Collection of Preference and Profile Information.

Users may reach a home page of a web site provided by server 320 via a user interface provided by user interface manager 332, with a button or link that allows a user to register for use of the web site. In one embodiment, the web site also provides conventional online dating services in conjunction with the services provided as described herein. If the user presses the button or link, the user is allowed to register as described above via a user interface provided by registration manager 330, which stores the user's user identifier and password into user/deal information storage 334, which may include conventional memory or disk storage and may also include a conventional database. If the user subsequently returns to the home page of the web site provided by user interface manager 332, another user interface control on the home page, such as two conventional text boxes, allows the user to log in. If the user uses the user interface control, the information from the text boxes is provided to registration manager 330, which validates the user using conventional techniques and the usernames and passwords stored in user/deal information storage 334. Following a successful registration or log in, registration manager 330 stores a cookie onto the user system 310 of the user who registered or logged in, the cookie containing an encrypted version of the user's username or a reference thereto, and registration manager 330 provides a main page to the user via user system 310. Subsequent elements of server 320 described below may use the cookie to identify the user by decrypting the user identifier using conventional techniques.

At any time, a user may provide or update preference or profile information about themselves by pressing one of two links provided from the main page and/or other pages provided by user interface manager 332 that each request a user interface page provided by preference manager 336 or profile manager 338. Preference manager 336 receives preferences of each user and profile manager 338 receives profile information as described above, via the user interfaces they provide, and each 336, 338 store such information they receive into user/deal information storage 334 associated with the user identifier of the user. Each user interface provided herein contains a link that allows a user to reach the main page provided by user interface manager 332. As noted above, preference manager 336 may receive or retrieve, using conventional techniques, preference information from social network systems 308, which may include conventional social network servers.

Collection of Offering Information.

Merchants or a system administrator may log into a web page provided by deal information manager 338, and once logged in, may provide information about the offering via a web page provided by deal information manager 338 as described above. Deal information manager 338 receives and stores into user/deal information storage 334 such information about the offering and a unique identifier identifying the offering that it generates.

User Action: Browse Other Users.

User interface manager 332 provides on the main page a link to allow the user to browse other users as described above. If the user presses the link, a request is generated to user browse manager 340, which provides a user interface to accept search parameters or a link to otherwise browse certain users as described above. If the user presses the link, a predefined set of search parameters is used, and if the user enters search parameters and presses a submit button, the user supplied search parameters are used, to perform a search of the users in user/deal information storage 334 by user browse manager 340.

User browse manager 340 displays the other users matching the parameters as a list of links to selected searched user manager 342, with URL parameter information that indicates the other user corresponding to the link. In one embodiment, links are displayed as usernames and other profile information, such as a photograph, may be displayed as part of the list as described above.

If the user clicks one of the links on the list, selected searched user manager 342 receives the URL parameter information corresponding to the link, and retrieves from user/deal information storage 334 and displays to the user, the preference and profile information from the other user corresponding to the URL parameter information it receives. Selected searched user manager 342 additionally displays as a link a title of the offerings corresponding to the other user, by scoring such offerings as described above and selecting those exceeding a threshold for such other user as described above. The links contain URL parameter information indicating the offering and the user identifier of the other user and are labeled to indicate that if the user clicks the link, a proposal for the offering may be made. If the user clicks a link, the URL parameter information is provided to proposal manager 344.

Other links for each such offering provided by selected searched user manager 342 contain URL parameter information identifying the offering. If the user clicks a link, selected searched user manager 342 displays detailed information about the offering and a link to proposal manager 344 with the user identifier of the other user browsed and the identifier of the offering information viewed. If the user clicks the link, the URL parameter information is provided to proposal manager 344 with a request for a proposal web page.

Making the Proposal.

When it receives the URL parameter information, proposal manager 344 provides a user interface to allow the information received as part of the proposal to be provided by the user as described above and received by proposal manager 344. The user may provide such information (e.g. details of what proportion or amount of the offering the other user will pay, a message containing proposed dates, etc.). The user supplies such information and presses a submit button and proposal manager 344 generates a unique identifier for the proposal, stores into user/deal information storage 334, the other information and the usernames of the user, other user, and the unique identifier of the offering selected, and indicates with the proposal in user/deal information storage 334 that the proposal has not been viewed and is not accepted.

In one embodiment, if the user is supposed to pay for some or all of the proposal according to the proposal, the user's payment information (e.g. credit card number, expiration date and CVV) is requested and received from the user via a web page containing a user interface provided by proposal manager 344, which proposal manager stores in user/deal information storage 334 associated with the proposal. In one embodiment, the user may be charged a fee for making the proposal as described above, but is not charged for their share of the offering under the proposal until the proposal is accepted. If the user is charged a fee, it is received via such payment information, as described above.

Viewing Proposals.

When users log in via registration manager 330, registration manager 330 checks the proposals in user/deal information storage 334 to determine whether the user has any proposals not read or not accepted, and if there are any unread or unaccepted proposals, provides a user interface to the user that includes a link to a user interface provided by acceptance manager 346.

If the user clicks the link, acceptance manager 346 reads the user's cookie and retrieves from user/deal information storage 334 headers of any proposals the user may have and displays a list of them as a set of links, the links including as URL parameter information the unique proposal identifier of such proposal. In one embodiment, the header of a proposal includes the username of the user who provided the proposal and a title of the offering corresponding to the proposal, such title being provided as part of the offering information and may include a photograph of the user who made the proposal. If the user clicks one of the links, acceptance manager 346 retrieves details about the offering and some of the profile information of the user who sent the proposal which it retrieves from user/deal information storage 334 and displays it to the user with a link to allow the user to see more information about the user who sent the proposal and links to accept or reject the proposal. Acceptance manager 346 also displays the payment information from the proposal (i.e. who will pay and how much) and links that allow the user to accept or reject the proposal. Acceptance manager 346 marks the proposal as read.

If the user clicks the link to see more information about the user, acceptance manager 346 retrieves preference and profile information for such user from user/deal information storage 334 and displays it to the user along with links to allow the user to accept or reject the proposal.

If the user clicks the link to accept the proposal, acceptance manager 346 prompts the user for payment information to pay for that user's share, if any, of the offering corresponding to the proposal in accordance with the price of the offering corresponding to the proposal and the share of the other user specified by the user who made the proposal. If the user provides acceptable payment information in a manner similar to that described above, or if the user's share of the offering corresponding to the proposal is zero, acceptance manager 346 will mark the proposal in user/deal information storage 334 as accepted and will charge the user who made the proposal that user's share of the proposal in accordance with the proposal shares specified and the price of the offering corresponding to the proposal.

If the user who receives the proposal rejects the proposal, acceptance manager 346 marks the proposal as rejected in user/deal information storage 334.

The Proposing User Checks for Accepted and Rejected Proposals.

When the user who sent the proposal logs into registration manager 330, it will check if the user has any accepted or rejected proposals, or if any of the user's proposals sent have expired, in addition to checking for proposals the user may have received from other users as described above. If there are any proposals accepted, rejected, or expired since the last time the user logged in, or the user has received any proposals from other users, registration manager 330 displays a link to acceptance manager 346 on the main page it displays to users who have successfully logged in with their username and password.

If the user clicks the link, in addition to the actions described above, acceptance manager 346 displays a list of message headers indicating acceptance or rejection of the proposals so accepted or rejected, each as links to a message that, if clicked by the user, contain a message indicating whether the user accepted or rejected the proposal or whether the proposal expired (i.e. the end date for acceptance of the offering corresponding to the proposal has passed) links to the offering and to the preference and profile information of the user who accepted or rejected the proposal, and acceptance manager 346 provides such information to the user if the user presses such links.

If the proposal was accepted, acceptance manager 346 generates, stores as part of the proposal stored in user/deal information storage 334 and provides as part of the message to the user and stores with the proposal in user/deal information storage 334 a receipt or any unique identifier or other information that may be used to redeem the offering from the offering information for that offering in user/deal information storage 334. The user and other user may communicate via a conventional e-mail facility (not shown) to arrange the details for them to consume the offering.

As noted above, the receipt or unique identifier used to redeem the offering may be provided upon acceptance by the other user to whom the proposal was made without requiring any payment, and payment may be made directly to the merchant providing the goods and/or services under the offering. The technique used to collect payment may be specified as part of the offering information as described above, and such specification is used to determine whether to charge one or both users as described above.

Arranging the Offering.

The user who made the accepted proposal may communicate with the merchant supplying the goods or services under the offering for the accepted proposal, for example by making a reservation for the service or supplying an address to send any goods. A phone number or e-mail address or web page link to use to communicate with the merchant and instructions on how the offering may be consumed may be provided as part of the offering information provided for the offering corresponding to the accepted proposal and acceptance manager 346 may include such information as part of the message it provides to the user who made the proposal.

In one embodiment, the user who made the proposal may communicate to the merchant preference information that the merchant uses to customize the products or services under the offering. In one embodiment, when an offering is accepted, acceptance manager 346 provides the identifier of the proposal to customization manager 348, which retrieves from user/deal information storage 334 profile (including names of each user) and preference information specified in the offering information for the offer, for one or both users in the proposal. Such information is specified by the merchant or system administrator and stored with the offering information as described above. Customization manager 348 provides such information retrieved to an e-mail address specified with such offering information. In one embodiment, the merchant may log into customization manager 348 and review such information, indexed by the users names of accepted proposals and/or the identifier provided for redemption of the offering as described above. The merchant may use such information to customize the goods or services it provides under the offering for one or both of the two users corresponding to the accepted proposal as described above.

Canceling Unaccepted Offers Made by the User to Other Users.

In one embodiment, when a user accepts a proposal, acceptance manager 346 provides the identifier of the proposal to cancellation manager 350 and an indication to withdraw proposals for the same offering by the same user, which retrieves the user identifier of the user who made the proposal and a unique identifier of the offering that is assigned to each offering and stored with the offering information by deal information manager 338. For each proposal made to another user from the same user and for the same offering, if the proposal is not read, cancellation manager 350 removes the proposal from user/deal information storage 334 and if the proposal has been read, cancellation manager 350 indicates the proposal in proposal storage as having been canceled (except for the first accepted proposal).

When displaying messages and headers to users, acceptance manager 346 checks to see if the proposal has been canceled while the user was viewing the message and before the proposal was accepted when it receives an acceptance, and if so, indicates to the user in the message body that the proposal is no longer valid because another user accepted a similar proposal from the same user. Acceptance manager 346 also revises the message and header to indicate that the proposal may no longer be accepted because another user has accepted a similar proposal from the same user, so that if the user who has seen the message for a proposal before it was canceled looks at it again after it was canceled, the user will understand that the proposal has been withdrawn. Acceptance manager 346 will not process further proposals from the same user for the same offering in this case.

Canceling Proposals for Offerings Whose Limit has been Reached.

In one embodiment, the offering information received by deal information manager 338 includes a limit of the amount of offerings that will be provided. In such embodiment, each time acceptance manager 346 receives an acceptance, it checks to determine whether the number of accepted proposals for the offering equals the limit specified for that offering. If so, acceptance manager 346 marks the offering as withdrawn in user/deal information storage 334, does not allow any further proposals for such offering to be accepted and provides the identifier of the offering and an indication to withdraw the offering to cancellation manager 350. Cancellation manager 350 deletes from user/deal information storage 334 unread and unaccepted proposals for the offering corresponding to the identifier it receives from all users as described above, and acceptance manager 346 displays messages for the read but not accepted proposals for such offering from all users as canceled or withdrawn as described above and indicates the reason for such cancellation or withdrawal. Cancellation manager 350 marks in user/deal information storage 334 any unaccepted proposals for the offering as withdrawn and unread by the proposing user. When the user who made the proposal logs in, registration manager 330 determines if the user who logged in has any proposals marked as withdrawn and unread, and if so, provides a link to acceptance manager 346 and indicates that one or more offers have been withdrawn because their limit or limits have been exceeded. If the user clicks the link, acceptance manager 346 displays a list of users for which offers have been withdrawn, and marks the proposals as read by the proposing user. The list of users is displayed as a set of links to selected searched user manager 342 in the same manner as that provided by user browse manager 340 described above.

User Action: Browse Offerings.

Registration manager 330 may provide a link from the main page that allows the user to see the currently applicable offerings. If the user clicks the link, titles from the currently applicable offerings are displayed by registration manager 330 along with other information from the offering, such as dates of acceptance, dates by which the offering must be consumed, and other information from the offering, all as links. If the user clicks the link, more detailed offering information for the offering corresponding to the link is displayed by deal browse manager 360, along with a link to allow the user to see other users to whom, according to the offering information and their preference and profile information, the offering is most likely to appeal, identified as described above. The link may contain URL parameter information that includes a unique identifier of the offering.

If the user clicks the link, the offering identifier is provided to user list manager 362, which identifies such other users as described above and displays one or more of the other users as a list of usernames and certain profile information, such as a photograph of each other user, optionally ordered as described above. If only one such other user is identified and displayed, such other user is the one that would be ordered first, as described above in one embodiment. User list manager 362 includes the user identifier of the user and the identifier of the offering as URL parameter information in each such link.

If the user clicks the link, selected listed user manager 364 receives the URL parameter information and displays preference and profile information for the other user corresponding to the URL parameter information it receives, and displays a link to allow the user to propose the offering to the other user, with the offering identifier and identifier of the other user as URL parameter information in the link. If the user presses the link, the URL parameter information is provided to proposal manager 344 as described above.

The user interfaces described herein may be displayed as conventional web pages. It is noted that the user may use the back button on their browser to move back to pages recently viewed. Links described herein as being provided on one page may be provided on other pages as well.

URL parameter information is information to the right of a slash which is to the right of the first level domain name: e.g. for a .com domain, URL parameter information may be 1234567 in the link " . . . zoosk.com/1234567". Additional URL parameter information may be used to direct the user to the appropriate element of server 320 (e.g. . . . " . . . zoosk.com/proposal/accept/1234567"., and communication interface 322 performs the function of routing requests for web pages to the appropriate element of server 320 based on the URL parameter information.

In one embodiment, the user who makes the proposal uses a different user system 310 from the user who accepts the proposal, and thus, at least three computer systems (including server 320) are used to sell the products and/or services corresponding to the offering. In one embodiment, at least one merchant is an entity that is independent (e.g. not under control of and not controlled by) the entity that operates server 320.

In one embodiment, the "other user" who accepts or rejects the proposal receives it from the user as a surprise, either because the other user does not know the user or is not expecting the proposal.

What is claimed is:

1. A computer-implemented method of selling and customizing one of a plurality of offers to at least a first user of a web site that assists in matching users of the web site to one another, the method comprising:
- receiving, by a programmed hardware computer processor coupled to a computer memory:
  - information about the plurality of offers, each for a product or service that at least some of the users may share;
  - an identifier of the first user and each of at least one second user; and
  - an identifier of the one of the plurality of offers that the first user will propose sharing with at least one of the at least one second user whose identifier is received; and
  - wherein at least one of said identifiers is received from the first user;
- generating and providing by the programmed hardware computer processor coupled to the computer memory that is used to communicate with the first user and the at least one second user, at least one proposal from the first user to each of the at least one second user to simultaneously share with the first user in consumption of the product or participation in receiving the service that is a subject of the one of the plurality of offers at a time after any acceptance of said proposal;
- receiving, at the programmed hardware computer processor coupled to the computer memory, from at least one of the at least one second user, an acceptance of the proposal provided to said second user;
- responsive to the acceptance received at the programmed hardware computer processor, identifying, by the programmed hardware computer processor coupled to the computer memory, characteristic or preference information that was received from the first user or any of the at least one second users prior to the at least one proposal being provided that will be used by a supplier of the product or service to customize the product or service provided under the proposal; and
- providing, by the programmed hardware computer processor coupled to the computer memory to the supplier of the product or service, either directly or by providing it to the first user, or any of the at least one second users from which the acceptance of the proposal was received, the characteristic or preference information identified.

2. The method of claim 1, wherein the product or service is customized after the acceptance to the proposal is received, responsive to a characteristic or preference of the first user and the second user from whom the acceptance was received.

3. The method of claim 1, wherein the product or service is customized after the acceptance to the proposal is received responsive to a characteristic or preference of the second user from whom the acceptance was received.

4. The method of claim 1, wherein the product or service customized comprises a restaurant menu.

5. The method of claim 1, wherein the product or service customized comprises a decorative item.

6. A computer-based system for selling and customizing one of a plurality of offers to at least a first user of a web site that assists in matching users of the web site to one another, the system comprising one or more hardware processors comprising:
- a deal information manager, comprising a programmed hardware computer processor coupled to a computer memory, and having an input for receiving information about the plurality of offers, each for a product or service that at least some of the users may share, the deal information manager for providing at an output coupled to a memory the information received at the deal information manager input;
- a proposal manager, comprising the programmed hardware computer processor coupled to the computer memory, and having an input for receiving from the first user:
  - an identifier of the first user and each of at least one second user;
  - an identifier of the one of the plurality of offers of the product or service that the first user will propose sharing with at least one of the at least one second user whose identifier is received;
- the proposal manager for providing via an output, the identifiers of the first user and the at least one second user, and the identifier of the one of the plurality of offers;
- an acceptance manager, comprising the programmed hardware computer processor coupled to the computer memory, and having an input coupled to the proposal manager output for receiving the identifiers of the first user and the at least one second user, and the identifier of the one of the plurality of offers, and coupled to the deal information manager output for receiving at least some of the information about the one of the plurality of offers, the acceptance manager for generating and providing at an output to each of the at least one second users, said at least some of the information about the one of the plurality of offers and the identifier of the first user in a form of a proposal to simultaneously share with the first user the product or service of the one of the plurality of offers after the proposal is accepted, the acceptance manager input additionally for receiving, from each of at least one of the at least one second user to whom the proposal was provided, an acceptance of the proposal received by said second user and an identifier of said second user the acceptance manager additionally for providing the identifier of each said second user from whom the acceptance was received at the acceptance manager output; and
- a customization manager, comprising the programmed hardware computer processor coupled to the computer memory, and having an input coupled to the acceptance manager output for receiving the identifier of each second user from whom the acceptance was received, the customization manager for, for each second user from whom an acceptance was received, identifying and retrieving via an input/output at least one selected from preference information of such second user and at least one characteristic of said second user, the customization manager additionally for providing at an output for receipt by a party providing the product or service corresponding to the one of the plurality of offers, the at least one selected from the preference information and the at least one characteristic, of said second user.

7. The system of claim 6, wherein:
- the proposal manager is additionally for providing at the proposal manager output the identifier of the first user;
- the acceptance manager input is additionally for receiving the identifier of the first user;
- the acceptance manager is additionally for providing the identifier of the first user at the acceptance manager output;
- the customization manager input is additionally for receiving the identifier of the first user and for receiving at least one selected from preference information of the first user and at least one characteristic of the first user; and the customization manager is additionally for providing at the customization manager output after the acceptance to the proposal is received the at least one selected from the preference information of the first user and the at least one characteristic of the first user.

8. The system of claim 6, wherein the product or service comprises a restaurant menu.

9. The system of claim 6, wherein the product or service comprises a decorative item.

10. A computer program product comprising a non-transitory computer useable medium having computer readable program code embodied therein for selling and customizing one of a plurality of offers to at least a first user of a web site that assists in matching users of the web site to one another, the computer program product comprising computer readable program code devices configured to program and cause a computer system comprising a hardware computer processor and a computer memory to:

receive:
information about the plurality of offers, each for a product or service that at least some of the users may share;
an identifier of the first user and each of at least one second user; and
an identifier of the one of the plurality of offers that the first user will propose sharing with at least one of the at least one second user whose identifier is received; and
wherein at least one of said identifiers is received from the first user;

generate and provide via a server computer system that is used to communicate with the first user and the at least one second user, at least one proposal from the first user to each of the at least one second user to simultaneously share with the first user in consumption of the product or participation in receiving the service that is a subject of the one of the plurality of offers at a time after any acceptance of said proposal;

receive, at the server computer system, from at least one of the at least one second user, an acceptance of the proposal provided to said second user;

responsive to the acceptance received, identify characteristic or preference information that was received from the first user or any of the at least one second users prior to the at least one proposal being provided that will be used by a supplier of the product or service to customize the product or service provided under the proposal; and provide to the supplier of the product or service, either directly or by providing it to the first user, or any of the at least one second users from which the acceptance of the proposal was received, the characteristic or preference information identified.

11. The computer program product of claim 10, wherein the product or service is customized after the acceptance to the proposal is received, responsive to a characteristic or preference of the first user and the second user from whom the acceptance was received.

12. The computer program product of claim 10, wherein the product or service is customized after the acceptance to the proposal is received responsive to a characteristic or preference of the second user from whom the acceptance was received.

13. The computer program product of claim 10, wherein the product or service customized comprises a restaurant menu.

14. The computer program product of claim 10, wherein the product or service customized comprises a decorative item.

* * * * *